United States Patent
Naito et al.

(10) Patent No.: US 9,892,861 B2
(45) Date of Patent: Feb. 13, 2018

(54) ANODE BODY FOR SOLID ELECTROLYTIC CAPACITOR

(71) Applicant: SHOWA DENKO K.K., Tokyo (JP)

(72) Inventors: Kazumi Naito, Tokyo (JP); Shouji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 200 days.

(21) Appl. No.: 14/410,413

(22) PCT Filed: Apr. 11, 2013

(86) PCT No.: PCT/JP2013/060896
§ 371 (c)(1),
(2) Date: Dec. 22, 2014

(87) PCT Pub. No.: WO2013/190885
PCT Pub. Date: Dec. 27, 2013

(65) Prior Publication Data
US 2015/0340163 A1    Nov. 26, 2015

(30) Foreign Application Priority Data

Jun. 22, 2012   (JP) ................................. 2012-140963

(51) Int. Cl.
| | | |
|---|---|---|
| H01G 9/00 | (2006.01) | |
| H01G 9/052 | (2006.01) | |
| H01G 9/042 | (2006.01) | |
| H01G 9/15 | (2006.01) | |

(52) U.S. Cl.
CPC ......... *H01G 9/0525* (2013.01); *H01G 9/0029* (2013.01); *H01G 9/0036* (2013.01); *H01G 9/052* (2013.01); *H01G 9/042* (2013.01); *H01G 9/15* (2013.01)

(58) Field of Classification Search
None
See application file for complete search history.

(56) References Cited

U.S. PATENT DOCUMENTS

| | | | |
|---|---|---|---|
| 3,166,693 A * | 1/1965 | Haring et al. ......... | H01G 9/052 257/43 |
| 4,971,757 A * | 11/1990 | Day .................... | C22C 1/045 419/23 |
| 6,193,779 B1 | 2/2001 | Reichert et al. | |
| 6,478,845 B1 | 11/2002 | Lunk et al. | |
| 6,876,083 B2 | 4/2005 | Yano et al. | |
| 2004/0016978 A1 | 1/2004 | Yano et al. | |
| 2004/0111849 A1* | 6/2004 | Omori .................. | H01G 9/0032 29/25.03 |

FOREIGN PATENT DOCUMENTS

| | | |
|---|---|---|
| CN | 100490035 C | 5/2009 |
| JP | 54-35566 B2 | 11/1979 |
| JP | 1-218796 A | 8/1989 |
| JP | 11-6060 A | 1/1999 |
| JP | 11-256322 A | 9/1999 |
| JP | 2003-105412 A | 4/2003 |
| JP | 2003-234083 A | 8/2003 |
| JP | 2003-272959 A | 9/2003 |
| JP | 2004-349658 A | 12/2004 |
| JP | 2004-349683 A | 12/2004 |
| WO | 2004/055843 A1 | 7/2004 |
| WO | 2012/086272 A1 | 6/2012 |
| WO | 2013/058018 A1 | 4/2013 |

OTHER PUBLICATIONS

International Search Report for PCT/JP2013/060896 dated May 28, 2013 [PCT/ISA/210].
Communication dated Jul. 1, 2016 from the European Patent Office issued in corresponding Application No. 13 807 439.8.

* cited by examiner

*Primary Examiner* — Jessee Roe
*Assistant Examiner* — Ngoclan T Mai
(74) *Attorney, Agent, or Firm* — Sughrue Mion, PLLC

(57) ABSTRACT

An anode body for a capacitor formed by subjecting the sintered body which is obtained by sintering the molded body of tungsten powder to chemical conversion treatment, which anode body is doped with potassium in the amount of 0.003 to 0.3 mass %; a method of producing an anode body for a capacitor formed by subjecting the sintered body which is obtained by sintering the molded body of tungsten powder to chemical conversion treatment, including a process of doping the anode body with potassium in an amount of 0.003 to 0.3 mass %; and a solid electrolytic capacitor using the anode body.

10 Claims, No Drawings

1

ANODE BODY FOR SOLID ELECTROLYTIC CAPACITOR

CROSS REFERENCE TO RELATED APPLICATIONS

This application is a National Stage of International Application No. PCT/JP2013/060896, filed on Apr. 11, 2013, which claims priority from Japanese Patent Application No. 2012-140963, filed on Jun. 22, 2012, the contents of all of which are incorporated herein by reference in their entirety.

TECHNICAL FIELD

The present invention relates to an anode body for a capacitor comprising a sintered body obtained by sintering tungsten powder, and a solid electrolytic capacitor having the anode body.

BACKGROUND ART

With the progress of small-size, high-speed and lightweight electronic devices such as cellular phones and personal computers, the capacitor used for these electronic devices is demanded to be light in weight and smaller in size and to have a larger capacitance and a lower equivalent series resistance (ESR).

An electrolytic capacitor is composed of a conductor (an anode body) as one electrode, a dielectric body formed in the surface layer of the electrode, and the other electrode (semiconductor layer) provided thereon. As an example of such a capacitor, an electrolytic capacitor has been proposed, which capacitor is produced by anodically oxidizing an anode body for a capacitor comprising a sintered body made of a valve-acting metal powder which can be anodized such as tantalum to form a dielectric layer made of the oxide of the metal on an inner layer of fine pores and on the outer surface layer of the electrode, polymerizing a semiconductor precursor (monomer for conductive polymer) on the dielectric layer to form a semiconductor layer comprising a conductive polymer, and forming an electrode layer on a predetermined part of the semiconductor layer.

The electrolytic capacitor using tungsten as a valve-acting metal and employing the sintered body of the tungsten powder as an anode body can attain a larger capacitance compared to the electrolytic capacitor obtained with the same formation voltage by employing the anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876,083 B2); Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 (U.S. Pat. No. 7,154,743 B2)) discloses an electrolytic capacitor using an anode selected from tantalum, niobium, titanium and tungsten, but it does not describe a specific example using tungsten in the specification.

As the prior art relevant to the preferable embodiment of the present invention in which granulated powder as a material of a sintered body of tungsten silicide powder is doped with potassium, a method of making a potassium-doped tungsten wire to improve the creep tolerance of tungsten wire for use in the filaments for incandescent lamps has been disclosed. The publication teaches adding silicon and aluminum as a sintering agent so as to be contained in an amount of less than 10 ppm each after the sintering (JP-A-2003-105412 (U.S. Pat. No. 6,478,845); Patent Document 4).

PRIOR ART

Patent Document

Patent Document 1: JP-A-2004-349658
Patent Document 2: JP-A-2003-272959
Patent Document 3: WO 2004/055843
Patent Document 4: JP-A-2003-105412

DISCLOSURE OF THE INVENTION

Problems to be Solved by the Invention

As a tungsten powder which can solve the leakage current (LC) problem in the electrolytic capacitor using as an anode body comprising a sintered body of the tungsten powder, the present inventors have invented a tungsten powder, a part of the surface of which is made to be tungsten silicide so as to make the powder have a silicon content within a specific range, an anode body of the capacitor made by sintering the tungsten powder, and a solid electrolytic capacitor using the anode body as an electrode, and filed a patent application (WO 2012/086272).

When a solid electrolytic capacitor is produced using a sintered body (anode body) of the tungsten powder, a molded body in which a lead wire is implanted is made from tungsten granulated powder and a lead wire, is molded by heating in vacuum to be made into a sintered body. In some cases, cracks, chaps and/or chips (hereinafter referred to as "appearance defects") are generated in the face of the sintered body in which the lead wire is implanted, or in the part of the faces perpendicular to the implanted face and near to the implanted face.

In such defective products, decrease in the capacitance and LC defects are caused when a solid electrolytic capacitor is produced using the sintered body as an anode body. If the density of the sintered body is increased by raising the sintering temperature as the countermeasure against the problem, the probability of the appearance defects is decreased, but the voids (fine pores) in the sintered body become reduced in size. As a result, when a sintered body having a high density as an anode is used, it becomes difficult to provide a semiconductor layer serving as a cathode in the fine pores after forming a dielectric layer on the surface inside the fine pores.

Such occurrence of appearance defects barely matters in the sintered body made from granulated powder of tantalum or niobium, and is specific to the sintered body made from tungsten granulated powder.

Accordingly, an objective of the present invention is to provide an anode body for a solid electrolytic capacitor, in which appearance defects are not generated in the face of the sintered body of tungsten powder, in which the lead wire is implanted, and in the surfaces perpendicular to the face in which the lead wire is implanted and near to the implanted face.

Means to Solve the Problem

As a result of intensive study to solve the above problem, the present inventors have found that, in an anode body for a capacitor produced by subjecting the sintered body obtained by sintering the molded body of tungsten powder (primary powder (i.e. raw material powder) or secondary powder (i.e. granulated powder) to chemical conversion treatment, by doping the anode body with a specific amount of potassium before molding the primary powder or granulated powder or at the time of sintering the molded body, appearance defects such as cracks, chaps and chips are not generated even if the density of the anode body is not increased by elevating the sintering temperature, and decrease in the fine pore size are not observed either.

With respect to the tungsten wire material in the above Patent Document 4, the document explicitly states that the silicon and aluminum of less than 100 ppm used as a sintering agent does not play a positive role in the final tungsten wire material. That is, while a material having no fine pores is essential for the tungsten wire material, the present invention, in which a dielectric layer and a semiconductor layer which serves as a cathode are provided on the surface of the fine pores, decreases appearance defects of the anode body with preventing the decrease in the size of fine pores by silicifying a part of the tungsten surface and doping the anode body with potassium. The present invention greatly differs from the technology of Patent Document 4 in that silicon plays an important role in the final capacitor products and aluminum is not used.

The present invention relates the following anode body for a capacitor, production method of the same and a solid electrolytic capacitor.

[1] An anode body for a capacitor, wherein the anode body uses as a base material a sintered body obtained by sintering a molded body of tungsten powder and the anode body is doped with potassium in an amount of 0.003 to 0.3 mass %.

[2] The anode body for a capacitor as described in [1] above, wherein the tungsten powder is a primary powder of tungsten, in which a part of particle surface thereof is silicified, or a secondary powder thereof.

[3] The anode body for a capacitor as described in [2] above, wherein a silicon content of the primary powder of tungsten, in which a part of the particle surface is silicified, is 0.05 to 7 mass %.

[4] The anode body for a capacitor as described in [2] above, wherein the primary powder of tungsten further comprises at least one element selected from nitrogen, carbon and boron.

[5] The anode body for a capacitor as described in [4] above, wherein a nitrogen element content is 0.01 to 0.5 mass %.

[6] The anode body for a capacitor as described in [4] above, wherein a carbon element content is 0.001 to 0.1 mass %.

[7] The anode body for a capacitor as described in [4] above, wherein a boron element content is 0.001 to 0.1 mass %.

[8] The anode body for a capacitor as described in [2] above, wherein the primary powder of tungsten contains 0.05 to 8 mass % of oxygen.

[9] The anode body for a capacitor as described in [2] above, wherein the primary powder of tungsten contains 1 to 500 ppm by mass of phosphorus element.

[10] The anode body for a capacitor as describe in [2] above, wherein each amount of elements other than silicon, potassium, nitrogen, carbon, boron, phosphorus and oxygen is 0.1 mass % (1,000 ppm by mass) or less.

[11] A method of producing an anode body for a capacitor using as a base material a sintered body obtained by sintering a molded body of tungsten powder, comprising a process of doping the anode body with potassium in an amount of 0.003 to 0.3 mass %.

[12] The method of producing an anode body for a capacitor as described in [11] above, wherein the anode body is doped with potassium by adding a potassium source to the tungsten powder before manufacturing the molded body.

[13] The method of producing an anode body for a capacitor as described in [11] above, wherein the anode body is doped with potassium by placing a potassium source in a sintering furnace at the time of sintering the molded body.

[14] The method of producing an anode body for a capacitor as described in [11] above, wherein the tungsten powder is a primary powder, in which a part of particle surface thereof is silicified, or granulated powder thereof.

[15] The method of producing an anode body for a capacitor as described in [14] above, wherein a silicon content of the primary powder of tungsten, in which a part of particle surface thereof is silicified, is 0.05 to 7 mass %.

[16] The method of producing an anode body for a capacitor as described in [14] above, wherein the primary powder of tungsten further comprises at least one element selected from nitrogen, carbon and boron.

[17] The method of producing an anode body for a capacitor as described in [16] above, wherein a nitrogen element content is 0.01 to 0.5 mass %.

[18] The method of producing an anode body for a capacitor as described in [16] above, wherein a carbon element content is 0.001 to 0.1 mass %.

[19] The method of producing an anode body for a capacitor as described in [16] above, wherein a boron element content is 0.001 to 0.1 mass %.

[20] The method of producing an anode body for a capacitor as described in [16] above, wherein the primary powder of tungsten contains 0.05 to 8 mass % of oxygen.

[21] The method of producing an anode body for a capacitor as described in [14] above, wherein the primary powder of tungsten contains 1 to 500 ppm by mass of phosphorus element.

[22] The method of producing an anode body for a capacitor as described in [14] above, wherein each amount of elements other than silicon, potassium, nitrogen, carbon, boron, phosphorus and oxygen is 0.1 mass % (1,000 ppm by mass) or less.

[23] The method of producing an anode body for a capacitor as described in [12] above, wherein the time before manufacturing the molded body is the time before the silicification of the tungsten, during the silicification of the tungsten, or after the silicification of the tungsten.

[24] The method of producing an anode body for a capacitor as described in [23] above, comprising sintering the primary powder or secondary powder of tungsten under reduced pressure in the presence of a silicon source and a potassium source to produce an aggregated product, pulverizing it and classifying it, to thereby dope the tungsten with potassium during the silicification of the tungsten.

[25] The method of producing an anode body for a capacitor as described in [23] above, comprising adding a potassium source to the primary powder or secondary powder of silicified tungsten, producing an aggregated product by sintering the tungsten powder under reduced pressure, pulverizing the aggregated product and classifying it, to thereby dope the tungsten with potassium after the silicification of the tungsten.

[26] The method of producing an anode body for a capacitor as described in [23] above, in a method of obtaining primary powder of tungsten by reducing tungsten oxide, ammonium tungstate or halogenated tungsten with hydrogen, comprising adding a predetermined amount of silicon source and potassium source before the hydrogen reduction, subsequently sintering the tungsten after the reduction under reduced pressure to produce an aggregated product, pulverizing it and classifying it, to thereby dope the tungsten with potassium during the silicification of tungsten.

[27] The method of producing an anode body for a capacitor as described in [23] above, comprising adding a silicon source to the primary powder or secondary powder of tungsten doped with a potassium source, sintering the tungsten powder under reduced pressure to produce an aggregated product, pulverizing it and classifying it, to thereby dope the tungsten with potassium before the silicification of the tungsten.

[28] The method of producing an anode body for a capacitor as described in any one of [12], [13] and [24] to [27] above, wherein at least one member selected from the group consisting of halide, mineral acid salt, carbonate, silicate, hydroxide, sulfide, sulfide hydride, mineral acid hydride, hydrogencarbonate and potassium-containing complex is used as a potassium source.

[29] The method of producing an anode body for a capacitor as described in [28] above, wherein potassium carbonate or potassium nitrate is used as a potassium source.

[30] The method of producing an anode body for a capacitor as described in [25] above, comprising sintering the primary powder of tungsten under reduced pressure in the presence of silicon and potassium carbonate or potassium nitrate to produce an aggregated product, pulverizing it and classifying it, to thereby dope the tungsten with potassium during the silicification of the tungsten.

[31] A solid electrolytic capacitor composed by the anode body for a capacitor described in any one of [1] to [10] above, or obtained by the method described in any one of [11] to [30] above, a counter electrode and a dielectric body interposed between the anode body and the counter electrode.

Effects of the Invention

The present invention is to provide an anode body for a capacitor, which is a sintered body (anode body) obtained by sintering the molded body of the tungsten powder and doped with potassium in the amount of 0.003 to 0.3 mass %. The present invention can suppress the occurrence of appearance defects (cracks, chaps and/or chips) in the face of the sintered body of tungsten powder in which the lead wire is implanted, or in the part of the faces perpendicular to the implanted face and near to the implanted face.

In the case of a sintered body (anode body) using a tungsten powder (primary powder or secondary powder thereof), in which a part of the particle surface is silicified, as the tungsten powder, it can provide the solid electrolytic capacitor element produced using the anode body with a stable capacitance and a low leakage current (LC) as well as can suppress the appearance defects of the sintered body.

MODE FOR CARRYING OUT THE INVENTION

In the present invention, in an anode body for a capacitor which is formed by subjecting the sintered body obtained by sintering the molded body of tungsten powder to chemical conversion treatment, the anode body is doped with a slight amount of potassium. The doping amount of potassium is 0.003 to 0.3 mass %, preferably 0.003 to 0.2 mass %, more preferably 0.01 to 0.08 mass % in terms of potassium element to the total components of the sintered body. When the amount of potassium is less than 0.003 mass %, it does not show an effect. On the other hand, when the amount of potassium exceeds 0.3 mass %, it will reduce the capacitance and tends to increase the LC value of the solid electrolytic capacitor element produced from the sintered body, and is not preferable.

Examples of doping the anode body with potassium include: (1) a method of producing a molded body by adding a potassium source (to be described later) to the tungsten powder prior to the production of the molded body, followed by the sintering of the molded body to thereby dope the anode body with potassium and (2) a method of placing a potassium source in a sintering furnace at the time of sintering the molded body of the tungsten powder to thereby dope the anode body with potassium. Before explaining these methods specifically, the tungsten powder as a raw material is to be described below.

A commercial product can be used as a raw material tungsten powder. In the present invention, tungsten powder having a small particle diameter is preferable. The tungsten powder having a still smaller particle diameter is more preferable and can be obtained by, for example, pulverizing the tungsten trioxide powder under hydrogen atmosphere; or reducing the tungstic acid, salt thereof (ammonium tungstate and the like) and tungsten halide using a reducing agent such as hydrogen and sodium, and appropriately selecting the reducing conditions. Also, the tungsten powder can be obtained by reducing the tungsten-containing mineral directly or through several steps and by selecting the reducing conditions.

The tungsten powder used in the present invention may be the granulated one as mentioned below (hereinafter, when tungsten powders are classified based on whether they are granulated or not, the ungranulated tungsten powder and the granulated powder are referred to as the "primary powder" and the "granulated powder", respectively.)

The tungsten powder in which a part of the particle surface is silicified can be preferably used.

The tungsten powder in which a part of the particle surface is silicified can be obtained by, for example, mixing the silicon powder well into the tungsten powder and allowing the mixture to react by heating generally at a temperature of 1,100° C. or higher and 2,600° C. or lower under reduced pressure of $10^{-1}$ Pa or less. In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body produced using the tungsten powder, which is preferable. The tungsten silicide content can be adjusted by the silicon amount to be added. The silicon content of the tungsten powder of the present invention is preferably 7 mass % or less, more preferably 0.05 to 7 mass %, and particularly preferably 0.2 to 4 mass %. The tungsten powder containing silicon within the above-mentioned range is a preferable powder for use in the electrolytic capacitors, imparting better LC characteristics to the capacitors.

Further, tungsten powder, in which a part of the particle surface is silicified, used in the present invention may contain oxygen, nitrogen, carbon, boron, phosphorus and various other elements. Particularly, the tungsten powder in which either element of carbon and boron exists as tungsten carbide or tungsten boride on a part of the surface of the tungsten powder is preferably used.

As an example of the method for allowing nitrogen element to be contained in tungsten powder, there is a method of placing the tungsten powder at 350 to 1,500° C. under reduced pressure (generally 1 Pa or less) of a nitrogen gas atmosphere for from one minute to ten hours.

Nitrogen element may be incorporated in a sintered body material or a sintered body later at any time in each of a stage to obtain the mixed powder or a stage to obtain a sintered body under the similar conditions as in the case of incorporating nitrogen in tungsten powder. Thus, the timing of adding nitrogen element is not specified but it is preferable to add nitrogen element in an early stage of the production process. Addition of nitrogen element can prevent excessive oxidation of the powder when the powder is handled in air.

As the content of nitrogen element, it is preferable to allow nitrogen element to remain in the anode body in an amount of 0.01 to 0.5 mass %, more preferably 0.05 to 0.3 mass %. Among tungsten powders, when nitrogen element is added to the primary powder, for example, the content of nitrogen element of the primary powder may be adjusted to about the same amount to two fold amount of the target nitrogen content in the anode body as a measure. That is, a preliminary test is to be performed to adjust the content of nitrogen element of the primary powder within a range of 0.01 to 1 mass % so as to attain the above-mentioned preferable nitrogen content as an anode body.

In the above-mentioned nitrogen element content, not only the nitrogen bonded to tungsten but also the nitrogen having no chemical bond with tungsten (e.g. nitrogen forming a solid solution) is included.

As an example of the method of carbonizing a part of the particle surface of the tungsten powder, there is a method of placing the tungsten powder at 300 to 1,500° C. under reduced pressure (usually $10^3$ Pa or less) in a high temperature vacuum furnace using carbon electrodes for from one minute to ten hours. The carbon element content can be adjusted by selecting the temperature and period of time. It is preferable to add the carbon element so as to make the carbon element content in the obtained sintered body be 0.001 to 0.1 mass %, more preferably to 0.01 to 0.1 mass %. The timing of the carbonization is the same as the above-mentioned timing of incorporating the nitrogen element. However, since carbon remains in the anode body in a high yield, the carbon content can be adjusted within the above-mentioned range whenever the carbonization is conducted. When the nitrogen gas is introduced into the furnace with carbon electrodes under predetermined conditions, the carbon element and nitrogen element are incorporated simultaneously, which enables the production of the tungsten powder containing the nitrogen element and carbon element.

As a method of the boronization of a part of the particle surface of the tungsten powder, there is a method of placing the boron element or a boron-containing compound as a boron source when granulating the tungsten powder. It is preferable to add the boron source so that the boron element content in the obtained anode body may be preferably 0.001 to 0.1 mass %, more preferably 0.01 to 0.1 mass %. Good LC characteristics can be attained when the boron content is within the above-mentioned range. When powder containing each element of silicon, nitrogen or carbon is put into a furnace having carbon electrodes, with a boron source placed in the furnace, and is granulated, it is possible to produce a tungsten powder, in which a part of the particle surface is further boronized. When the boron element is added in a predetermined amount, the LC characteristics are further improved in some cases.

The oxygen content in the tungsten powder is preferably 0.05 to 8 mass %, and more preferably 0.08 to 1 mass %.

As a method for controlling the oxygen content to 0.05 to 8 mass %, nitrogen gas containing oxygen is introduced when the powder is taken out from a high temperature vacuum furnace at the time of performing a step of incorporating any element among silicon, nitrogen, carbon or boron into the tungsten powder, as mentioned above. In case that the temperature at the time of being taken out from the high temperature vacuum furnace is lower than 280° C., the incorporation of oxygen into tungsten powder takes priority over nitrogen. By feeding the gas gradually, a predetermined oxygen element content can be obtained. By making each of the tungsten powders have a predetermined oxygen content in advance, it is possible to reduce the deterioration due to the irregular excessive oxidation during the subsequent processes for producing anode bodies for electrolytic capacitors using the powder. In cases where the oxygen element content is within the above-mentioned range, the LC characteristics of the produced electrolytic capacitors can be kept better. In the case when nitrogen is not introduced in this process, an inert gas such as argon and helium may be used instead of the nitrogen gas.

The phosphorus element content of the tungsten powder is preferably from 1 to 500 mass ppm.

As an example of the methods for incorporating the phosphorus element in an amount of 1 to 500 mass ppm in the tungsten powder in which at least a part of the surface is silicified and at least one element of nitrogen, carbon, boron or oxygen is further incorporated, there is a method of producing a powder containing phosphorus by placing phosphorous or a phosphorus compound in a high temperature vacuum furnace as a phosphorus source at the time of producing a primary powder or a granulated powder of each tungsten powder. It is preferable to incorporate phosphorus in the tungsten powder so as to make the phosphorus content within the above-mentioned range by controlling the amount of the phosphorus source and the like because the physical breakdown strength of the anode bodies produced thereof can be improved in some cases. When the phosphorus content falls within the range, LC characteristics of the manufactured electrolytic capacitor are further improved.

To attain better LC characteristics, it is preferable to keep the content of each of impurity elements in the anode body other than each element of tungsten, silicon, potassium, nitrogen, carbon, boron, oxygen and phosphorus to 1,000 mass ppm or lower. In order to keep the content of these elements to the above-mentioned value or lower, the amount of the impurity elements contained in the raw materials, pulverizing member to be used, containers and the like should be closely examined.

The tungsten powder may be in a form of granulated powder. Granulated powder is preferable due to its good flowability and easy operability for molding or the like. The granulated powder further may be the one in which the fine pore distribution is adjusted in the manner as JPA-2003-213302 discloses on the case of a niobium powder.

The granulated powder can also be obtained by adding at least one member of the liquid such as water and liquid resin to the primary powder so as to be made into the granules having an appropriate size; and sintering the granules by heating under reduced pressure. The reduced-pressure condition to obtain easy-handling granulated granules (for example, at 1 kPa or less under non-oxygen gas atmosphere such as hydrogen) and the high temperature standing condition (for example, from 1,100° C. to 2,600° C. for 0.1 to 100 hours) can be determined by a preliminary experiment. If there are no agglomerations of the granules with each other after the sintering, there is no need for pulverization.

Such granulated powder can be classified by a sieve into particles of a similar diameter. The average particle size within a range of preferably 50 to 200 µm, more preferably 100 to 200 µm, is suitable because the powder can smoothly flow from the hopper of the molding machine to a mold.

The tungsten primary powder having an average primary particle diameter of 0.1 to 1 µm, preferably 0.1 to 0.3 µm can increase the capacitance of the electrolytic capacitor, particularly when the capacitor is produced from the granulated powder thereof.

When obtaining such a granulated powder, it is favorable to make the granulated powder so as to have a specific surface area (by BET method) of preferably 0.2 to 20 $m^2/g$, more preferably 1.5 to 20 $m^2/g$, by controlling the above-mentioned primary particle diameter because it can further increase the capacitance of the electrolytic capacitor.

Next, a method of doping the anode body with potassium is to be described by taking the case of manufacturing a sintered body (anode body) by sintering the molded body of the tungsten primary powder or secondary powder (granulated powder), in which a part of the particle surface is silicified as being a preferred embodiment as a tungsten powder, as an example.

(1) Before Producing a Molded Body of the Tungsten Powder

In the present invention, a potassium source is added to the tungsten powder to be mixed in a stage prior to the molding of a molded body of the tungsten primary powder or secondary powder (granulated powder), and after molding, the molded body is to be sintered to thereby dope the sintered body with potassium.

Examples of the potassium source to be used include a compound and mineral containing potassium and potassium element. Among these, a potassium compound is a preferable material as being easy in handling. Examples of the potassium compound include halogenated compounds, mineral acid salt, carbonic acid salt, silicon acid salt, hydroxide, sulfide, hydrogen sulfide, mineral hydride, hydrogencarbonate and potassium-containing complex.

The doping with potassium is conducted prior to the molding of the above-mentioned primary or granulated powder, or at the time of sintering the above-mentioned molded body, using a potassium source.

Specific examples of the time to conduct doping prior to the molding of the above-mentioned primary powder or granulated powder include: (i) the period after the silicification of tungsten, (ii) the period during the silicification of tungsten and (iii) the period before the silicification of tungsten.

(i) The Period after the Silicification of Tungsten:

A tungsten powder doped with potassium is obtained by adding a potassium source to the tungsten primary powder or secondary powder silicified by the above-mentioned method, producing an aggregated product by calcining the tungsten powder under reduced pressure, pulverizing the aggregated product and classifying it.

(ii) The Period During the Silicification of Tungsten:

A tungsten powder doped with potassium is obtained by sintering the tungsten primary powder or secondary powder under reduced pressure in the presence of a silicon source and a potassium source to produce an aggregated product, pulverizing and classifying it.

As another embodiment, in a method of obtaining tungsten primary powder by reducing tungsten oxide, ammonium tungstate or halogenated tungsten with hydrogen, a tungsten powder doped with potassium can be obtained at the same time as the silicification by adding a predetermined amount of silicon source and potassium source before the hydrogen reduction, subsequently sintering the tungsten after the reduction under reduced pressure to produce an aggregated product, pulverizing it and classifying it.

(iii) The Period Before the Silicification of Tungsten:

A tungsten powder doped with potassium is obtained by adding a potassium source to tungsten powder to be mixed, followed by sintering under reduced pressure to produce an aggregated product, pulverizing it and classifying it. Subsequently, after adding a silicon source to the tungsten powder and sintering it under reduced pressure to produce an aggregated product, the product is pulverized and classified to obtain a tungsten silicide powder doped with potassium.

Among these methods, the method in (ii), in which a tungsten primary powder is calcined in the presence of a silicon source and a potassium source, is preferable because it is not cumbersome and the silicification and doping with potassium at a predetermined concentration can be conducted at one calcination.

The most preferable is the method of doping the tungsten powder with potassium during the silicification of tungsten by sintering the tungsten primary powder in the presence of silicon and potassium carbonate or potassium nitrate to produce an aggregated product, pulverizing it and classifying it.

In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body produced using the tungsten powder, which is preferable. The silicon content of the granulated powder is preferably 0.05 to 7 mass %, and particularly preferably 0.2 to 4 mass % as mentioned above. The tungsten powder having a silicon content within the above-mentioned range is a preferable powder for use in the solid electrolytic capacitors, imparting good LC characteristics to the capacitors. When the granulated powder has a silicon content of less than 0.05 mass %, it does not impart good LC characteristics to capacitors in some cases. When the silicon content exceeds 7 mass %, it produces an excess of silicified part in the granulated powder and a dielectric layer fails to be formed well in some cases when the sintered body is subjected to chemical conversion as an anode body.

It is desirable to adjust the specific surface area (by BET method) of the tungsten silicide granulated powder doped with potassium to preferably 0.2 to 20 $m^2/g$, more preferably 1.5 to 20 $m^2/g$, since it can further increase the capacitance of the solid electrolytic capacitor.

In the present invention, a sintered body obtained by the above-mentioned method is used as an anode body of a capacitor, a dielectric layer is formed on the surface of the anode body by chemical conversion treatment, and a semiconductor layer is formed on the dielectric layer. For forming a semiconductor layer, for example, a semiconductor precursor (at least one kind selected from a monomer compound having pyrrol, thiophene or aniline skeleton and various derivatives of these compounds) is subjected to multiple polymerization reactions to form a semiconductor layer comprising a conductive polymer and having a desired thickness. The anode body, on which a dielectric layer and a semiconductor layer are sequentially formed by the method may be used as a capacitor element as it is. Preferably, an electrode layer comprising a carbon layer and a silver layer being sequentially laminated on the above-mentioned semiconductor layer is provided on the semiconductor layer to form a capacitor element in order to improve electric contact with an external lead (e.g. lead frame).

EXAMPLES

The present invention is described below by referring to Examples and Comparative Examples, but the present invention is not limited thereto.

Examples 1 To 9 And Comparative Examples 1 To 2:

After mixing well silicon (a marketed product having an average particle diameter of 1 μm) and a solution in which potassium carbonate (commercially available reagent) is dissolved in 100 ml of water with 100 g of the tungsten primary powder having an average particle diameter of 0.5μm obtained by reducing tungsten oxide with hydrogen and drying the mixture at 80° C. under reduced pressure of $10^2$ Pa, the resultant was left to stand at 1,400° C. under reduced pressure of $10^{-1}$ Pa for 30 minutes and cooled to room temperature. The obtained aggregated product was pulverized and classified to obtain a granulated powder having an average particle diameter of 90μm (particle diameter of 25 to 160 μm; a specific surface area of 0.5 $m^2/g$). Here, by changing the silicon amount to be added to the above-mentioned tungsten primary powder and the potassium carbonate amount in the aqueous solution, the silicon amount and the potassium amount in the granulated powder were changed (silicon amount: 0 to 7.0 mass %, potassium amount: 0 to 0.2 mass %). The measured values in the granulated powder in each of examples are shown in Table 1. The ICP optical emission spectrometry was performed for the measurement.

Next, after manufacturing a molded body with implantation of a tungsten wire having an outer diameter of 0.29 mmφ, the molded body was left to stand at 1,420° C. under reduced pressure of $10^{-1}$ Pa for 30 minutes and cooled to room temperature to manufacture sintered bodies of 300 pieces per example having a size of 1.0×1.5×4.5 mm and a density of 8.85 $g/cm^3$ and the lead wire is implanted in the 1.0×1.5 mm face, 3.3 mm of which is inserted inside and 7 mm of which protrudes outside the sintered body.

At this stage, the sintered bodies of 20 pieces per example were randomly extracted, and after cutting off 6 millimeter of the lead wire, the face in which the lead wire is implanted was observed under a microscope to count appearance defects. The number of the appearance defects is the number of the defective parts having a length (straight-line distance) of 0.01 mm or more. With respect to the parts where a crack and a chip, a chip and a chap, or a chap and acrack are joined, they were counted as being separate defects. Table 1 shows an average number of the appearance defective parts (number of appearance defects) per sintered body.

The sintered body was subjected to chemical conversion in 0.1 mass % of nitric acid solution using the lead wire of the sintered body as an anode, and a separately-provided electrode as a cathode, at 10° C. for 8 hours at a current density of 2 mA/piece initially, and 10 V of constant voltage later to form a dielectric layer.

The sintered body on which a dielectric layer was formed was immersed in an ethanol solution of 5 mass % 3,4-ethylenedioxythiophene (hereinafter, referred to as "EDTH), dried at room temperature, dipped in a separately-prepared alcohol solution of 10 mass % naphthalenesulfonic acid iron, pulled up and reacted at 80° C. for 10 minutes. The series of the operations was repeated for five times. Next, a semiconductor layer comprising a conductive polymer was formed by electrolytic polymerization as follows.

The sintered body was immersed in 20 mass % EDTH ethanol solution, impregnated in a container made of stainless steel (SUS303) filled with separately prepared polymerization solution (EDTH and anthraquinone sulfonic acid were added to a solvent containing 30 parts by mass of water and 70 parts by mass of ethylene glycol so that the solution contains 0.4 mass % of EDTH and 0.6 mass % of anthraquinone sulfonic acid) to a determined depth, and electrolytic polymerization was performed at 20° C. and 65 μA for 45 minutes. After being pulled up from the solution, the sintered body was washed with water, washed with ethanol and dried. Furthermore, the sintered body was subjected to the post chemical conversion using the above-mentioned liquid for forming the dielectric layer at 20° C. for 15 minutes at a current density of 0.1 mA/piece initially, and 6.5 V of constant voltage later, washed with water, washed with ethanol and dried. The above-mentioned step of impregnation in 20 mass % EDTH ethanol solution, electrolytic polymerization and post chemical conversion as mentioned above was repeated eight times. A carbon layer and a silver paste layer were sequentially laminated on a predetermined part of the thus-obtained semiconductor layer, and an electrode layer was formed to thereby manufacture solid electrolytic capacitor elements of 128 pieces per example. Among these, 100 pieces were randomly selected to measure the capacitance and LC value. The capacitance was measured using an LCR meter manufactured by Agilent Technologies. The measurement was performed under conditions of 120 Hz and bias voltage of 2.5 V. The LC value was a value measured by applying a voltage of 2.5 V at room temperature for 30 seconds. The capacitance was measured by bringing each of the conductive lines wired to the LCR meter into contact with the electrode layer of the capacitor element and with the lead wire implanted in the capacitor element, respectively. In the measurement of LC, the value was determined from the current value of the circuit passing through the plus terminal of the power source, lead wire of the capacitor element and electrode layer of the capacitor element to the minus terminal of the power source.

TABLE 1

|  | Silicon content (mass %) | Potassium content (mass %) | Appearance defects (number of defects) |
|---|---|---|---|
| Example 1 | 0.05 | 0.005 | 0.4 |
| Example 2 | 0.1 | 0.007 | 0.1 |
| Example 3 | 0.2 | 0.01 | 0 |
| Example 4 | 1 | 0.03 | 0 |
| Example 5 | 4 | 0.05 | 0 |
| Example 6 | 7 | 0.07 | 0 |
| Example 7 | 7 | 0.1 | 0.3 |
| Example 8 | 0 | 0.05 | 0 |
| Example 9 | 0.2 | 0.2 | 0 |
| Comparative Example 1 | 0.2 | 0 | 3.2 |
| Comparative Example 2 | 0.2 | 0.001 | 3.0 |

Examples 10 To 18 And Comparative Examples 3 To 4:

After mixing well silicon (a marketed product having an average particle diameter of 1μm) and a solution in which potassium carbonate (commercially available reagent) is dissolved in 100 ml of water with 100 g of the tungsten primary powder having an average particle diameter of 0.3 μm obtained by reducing tungsten oxide with hydrogen and drying the mixture at 80° C. under reduced pressure of $10^2$ Pa, the resultant was left to stand at 1,400° C. under reduced pressure of $10^{-1}$ Pa for 30 minutes and cooled to room temperature. The obtained aggregated product was pulverized and classified to obtain a granulated powder having an average particle diameter of 120 μm (particle diameter of 30 to 180 μm; a specific surface area of 1.8 m²/g). Here, by changing the silicon amount to be added to the above-mentioned tungsten primary powder and the potassium carbonate amount in the aqueous solution, the silicon amount and the potassium amount in the granulated powder were changed (silicon amount: 0 to 7.0 mass %, potassium amount: 0 to 0.2 mass %). The measured values in the granulated powder in each of examples are shown in Table 2. The ICP optical emission spectrometry was performed for the measurement.

Next, after manufacturing a molded body with implantation of a tungsten wire having an outer diameter of 0.29 mmφ, the molded body was left to stand at 1,400° C. under reduced pressure of $10^{-1}$ Pa for 30 minutes and cooled to room temperature to manufacture sintered bodies of 300 pieces per example having a size of 1.0×1.5×4.5 mm and a density of 8.89 g/cm³ and the lead wire is implanted in the 1.0×1.5 mm face, 3.3 mm of which is inserted inside and 7 mm of which protrudes outside the sintered body.

At this stage, the sintered bodies of 20 pieces per example were randomly extracted, and after cutting off 6 millimeter of the lead wire, the face in which the lead wire was implanted was observed under a microscope to count appearance defects in the same way as in Examples 1 to 9 and Comparative Examples 1 to 2. Table 2 shows an average number of appearance defects per sintered body.

The sintered body was subjected to chemical conversion in 0.1 mass % of nitric acid solution using the lead wire of the sintered body as an anode, and a separately-provided electrode as a cathode, at 10° C. for 8 hours at a current density of 2 mA/piece initially, and 10 V of constant voltage later.

The sintered body on which a dielectric layer was formed was immersed in an ethanol solution of 5 mass % 3,4-ethylenedioxythiophene (hereinafter, referred to as "EDTH), dried at room temperature, dipped in a separately-prepared alcohol solution of 10 mass % naphthalenesulfonic acid iron, pulled up and reacted at 80° C. for 10 minutes. The series of the operations was repeated for five times. Subsequently, a semiconductor layer comprising a conductive polymer was formed by electrolytic polymerization as follows in the same way as in Examples 1 to 9 and Comparative Examples 1 to 2. Next, a carbon layer and a silver paste layer were sequentially laminated on a predetermined part of the semiconductor layer, and an electrode layer was formed to thereby manufacture solid electrolytic capacitor elements of 128 pieces per example. Among these, 100 pieces were randomly selected to measure the capacitance and LC value in the same way as in Examples 1 to 9 and Comparative Examples 1 to 2.

TABLE 2

| | Silicon content (mass %) | Potassium content (mass %) | Appearance defects (number of defects) |
|---|---|---|---|
| Example 10 | 0.05 | 0.005 | 0.3 |
| Example 11 | 0.1 | 0.007 | 0.1 |
| Example 12 | 0.2 | 0.01 | 0 |
| Example 13 | 1 | 0.03 | 0 |
| Example 14 | 4 | 0.05 | 0 |
| Example 15 | 7 | 0.07 | 0 |
| Example 16 | 7 | 0.1 | 0.3 |
| Example 17 | 0 | 0.05 | 0 |
| Example 18 | 0.2 | 0.2 | 0 |
| Comparative Example 3 | 0.2 | 0 | 3.4 |
| Comparative Example 4 | 0.2 | 0.001 | 3.3 |

As shown in Table 1 and Table 2, the sintered bodies which do not contain potassium (Comparative Examples 1 and 3) or is doped with potassium in the amount of 0.001 mass % (Comparative Examples 2 and 4) had the number of appearance defects within the range of 3.0 to 3.4, the sintered bodies in Examples (Examples 1 to 18) which is doped with potassium in the amount of 0.005 to 0.2 mass % had the number of appearance defects as low as 0 to 0.4, and the number of appearance defects was significantly improved by the doping with a small amount of potassium. When the sintered body is doped with a large amount of potassium, a decreasing trend of the capacitance and increasing trend of the LC value were shown.

Tables 3 and 4 show the average values of the capacitance and LC values determined by measuring sintered bodies of 100 pieces per example with respect to the solid electrolytic capacitor elements in Examples 5 and 8 and those in Examples 14 and 17, respectively.

TABLE 3

| | Silicon content (mass %) | Potassium content (mass %) | Average number of appearance defects | Capacitance (μF) | LC (μA) |
|---|---|---|---|---|---|
| Example 5 | 4.00 | 0.050 | 0.0 | 448 | 30 |
| Example 8 | 0.00 | 0.050 | 0.0 | 255 | 103 |

TABLE 4

| | Silicon content (mass %) | Potassium content (mass %) | Average number of appearance defects | Capacitance (μF) | LC (μA) |
|---|---|---|---|---|---|
| Example 14 | 4.00 | 0.050 | 0.0 | 675 | 49 |
| Example 17 | 0.00 | 0.050 | 0.0 | 308 | 165 |

As can be seen from Tables 3 and 4, all the sintered bodies of Examples 5, 8, 14 and 17 doped with potassium in the amount of 0.05 mass % showed good results in terms of the number of appearance defects. In addition, the elements containing 4.0 mass % of silicon (in Examples 5 and 14) had a higher capacitance and significantly lower leakage current (LC) compared to the elements without containing silicon (in Examples 8 and 17).

INDUSTRIAL APPLICABILITY

The anode body for a capacitor of the present invention, wherein the sintered body (anode body) of tungsten powder is doped with potassium in the amount of 0.003 to 0.3 mass %, can suppress the occurrence of appearance defects (cracks, chaps and/or chips) in the face of the sintered body in which the lead wire is implanted, or in the part of the faces perpendicular to the implanted face and near to the implanted face.

In the case of a sintered body (anode body) using a tungsten powder, in which a part of the particle surface is silicified, as the tungsten powder, it can provide the solid electrolytic capacitor element produced using the anode body with a stable capacitance and a low leakage current (LC) as well as can suppress the appearance defects of the sintered body.

The invention claimed is:

1. A solid electrolytic capacitor composed by an anode body for a capacitor, a counter electrode and a dielectric body interposed between the anode body and the counter electrode, wherein the anode body uses as a base material a sintered body obtained by sintering a molded body of tungsten powder and the anode body is doped with potassium in an amount of 0.003 to 0.3 mass %, and wherein the tungsten powder is a primary powder of tungsten, in which a part of particle surface thereof is silicified, or a secondary powder thereof.

2. The solid electrolytic capacitor as claimed in claim 1, wherein a silicon content of the primary powder of tungsten, in which a part of the particle surface is silicified, is 0.05 to 7 mass %.

3. The solid electrolytic capacitor as claimed in claim 1, wherein the primary powder of tungsten further comprises at least one element selected from nitrogen, carbon and boron.

4. A solid electrolytic capacitor composed by an anode body for a capacitor obtained by a method using as a base material a sintered body obtained by sintering a molded body of tungsten powder, comprising a process of doping the anode body with potassium in an amount of 0.003 to 0.3 mass %, a counter electrode and a dielectric body interposed between the anode body and the counter electrode, and wherein the tungsten powder is a primary powder, in which a part of particle surface thereof is silicified, or granulated powder thereof.

5. The solid electrolytic capacitor as claimed in claim 4, wherein the anode body is doped with potassium by adding a potassium source to the tungsten powder before manufacturing the molded body.

6. The solid electrolytic capacitor as claimed in claim 4, wherein the anode body is doped with potassium by placing a potassium source in a sintering furnace at the time of sintering the molded body.

7. The solid electrolytic capacitor as claimed in claim 4, wherein a silicon content of the primary powder of tungsten, in which a part of particle surface thereof is silicified, is 0.05 to 7 mass %.

8. The solid electrolytic capacitor as claimed in claim 4, wherein the primary powder of tungsten further comprises at least one element selected from nitrogen, carbon and boron.

9. The solid electrolytic capacitor as claimed in claim 5, wherein at least one member selected from the group consisting of halide, mineral acid salt, carbonate, silicate, hydroxide, sulfide, sulfide hydride, mineral acid hydride, hydrogencarbonate and potassium-containing complex is used as a potassium source.

10. The solid electrolytic capacitor as claimed in claim 9, wherein potassium carbonate or potassium nitrate is used as a potassium source.

* * * * *